United States Patent [19]

van der Mark

[11] Patent Number: 5,170,112
[45] Date of Patent: Dec. 8, 1992

[54] POWER SUPPLY DEVICE FOR SUPPLYING POWER TO A FILAMENT OF A RADAR TRANSMITTER

[75] Inventor: Jacobus van der Mark, Apeldoorn, Netherlands

[73] Assignee: Hollandse Signaalapparaten B.V., Hengelo, Netherlands

[21] Appl. No.: 757,592

[22] Filed: Sep. 11, 1991

[30] Foreign Application Priority Data

Oct. 3, 1990 [NL] Netherlands ......................... 9002148

[51] Int. Cl.$^5$ ............................................... H05B 6/68
[52] U.S. Cl. ....................................... 323/338; 363/60; 219/10.55 B
[58] Field of Search ........................... 363/60; 323/338; 219/10.55 B; 315/39, 105; 331/86, 87, 181, 186; 336/170, 220

[56] References Cited

U.S. PATENT DOCUMENTS 2,549,366  4/1951  Bostick .
3,514,566  5/1970  Ironfield .
4,591,681  5/1986  Akao ........................... 219/10.55 B
4,835,353  5/1989  Smith et al. .................. 219/10.55 B

FOREIGN PATENT DOCUMENTS 2529296  1/1977  Fed. Rep. of Germany .

OTHER PUBLICATIONS

IEEE Transactions on Magnetics, vol. MAG-7, No. 1, Mar. 1971, Harold W. Lord, "Pulse Transformers", pp. 17-28.

Primary Examiner—Emanuel T. Voeltz
Attorney, Agent, or Firm—Oblon, Spivak, McClelland, Maier & Neustadt

[57] ABSTRACT

An improved power supply device is disclosed where the filament (2) of a transmitter tube (1) is powered by an AC generator (18) via a transformer (12) and a rectifier (24), and where the AC generator (18) receives a feedback via the bifilar winding (5) of a pulse transformer (3).

8 Claims, 3 Drawing Sheets

5,170,112

POWER SUPPLY DEVICE FOR SUPPLYING POWER TO A FILAMENT OF A RADAR TRANSMITTER

BACKGROUND OF THE INVENTION

The invention relates to a power supply device, particularly suitable for supplying power to a filament of a transmitter tube, provided with a filament transformer, a pulse transformer and terminals for an AC generator, where a secondary side of the filament transformer is coupled with the filament, a primary side of the filament transformer is coupled with the terminals and where a secondary side of the pulse transformer is coupled with the filament.

Such a device can be applied in a radar transmitter for the generation of radar transmit pulses. The radar transmitter will be provided with a high-power radar transmitter tube, such as a cross-field amplifier, a travelling wave tube or a klystron, whose cathode is at a pulsed high-voltage potential. A problem, however, is posed by the filament, which forms the cathode or is contained in the cathode and which must be supplied with a filament voltage. Filament voltage is required to heat the cathode to a high temperature, to ensure electron emission to a sufficient degree.

On the basis of a solution, known from the literature, it is essential to the filament voltage transformer that the capacitance between the primary and secondary winding is very small, since this capacitance forms a parasitic load on the pulse transformer which supplies the cathode of the radar transmitter tube with pulsed high voltage. This type of transformer having a small capacitance between the windings is known to possess a high leakage self-inductance, as a result of which, in loaded condition, the output voltage among other things depends on the frequency of the primary voltage and the temperature of the transformer. As such this transformer is less suitable for supplying a filament, whose voltage has been stipulated by the manufacturer.

SUMMARY OF THE INVENTION

The power supply device according to the invention eliminates these drawbacks and is characterised in that the secondary side of the pulse transformer is coupled with the filament via a bifilar winding, the power supply device being furthermore provided with a decoupling network through which the bifilar winding is earthed.

It is therefore possible to connect a voltmeter to the filament via the bifilar winding, enabling the filament voltage to be continuously monitored.

The use of bifilar winding for the secondary winding of a pulse transformer, which supplies the radar transmitter tube with a pulsed high voltage, is as such an established technique. The filament voltage is connected between the two ends of the windings which are substantially at earth potential and the filament of the radar transmitter tube is connected between the two ends of the winding which are at the pulsed high voltage.

A concomitant of this solution is that the heater current flows through the secondary winding of the pulse transformer. Consequently, additional provisions for the cooling of the secondary filament will have to be made and extra thick wire or foil for the secondary winding will have to be selected. This renders the pulse transformer less compact and increases the leakage self-inductance of the pulse transformer. This leakage self-inductance determines the actual quality of a pulse transformer, it restricts the possible slope of the high-voltage pulse and the maximum possible transformation ratio. The above power supply device according to the invention does not have these drawbacks.

BRIEF DESCRIPTION OF THE DRAWINGS

The invention will now be described in more detail with reference to the following figures, of which.

DETAILED DESCRIPTION OF THE INVENTION

Figure 1:
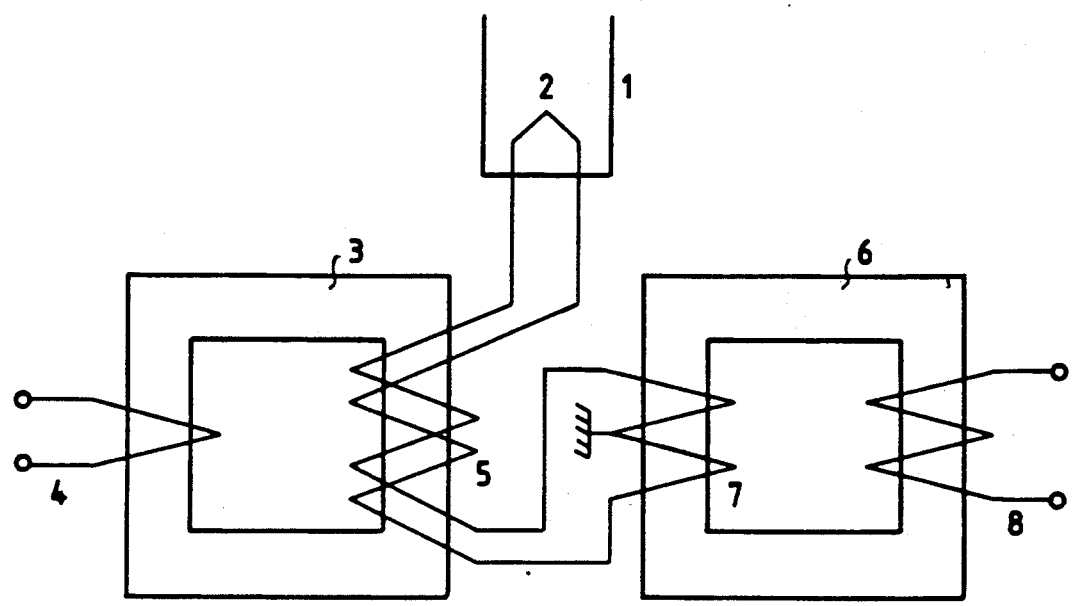
FIG. 1 represents a diagram of a state-of-the-art power supply device.
Figure 2:
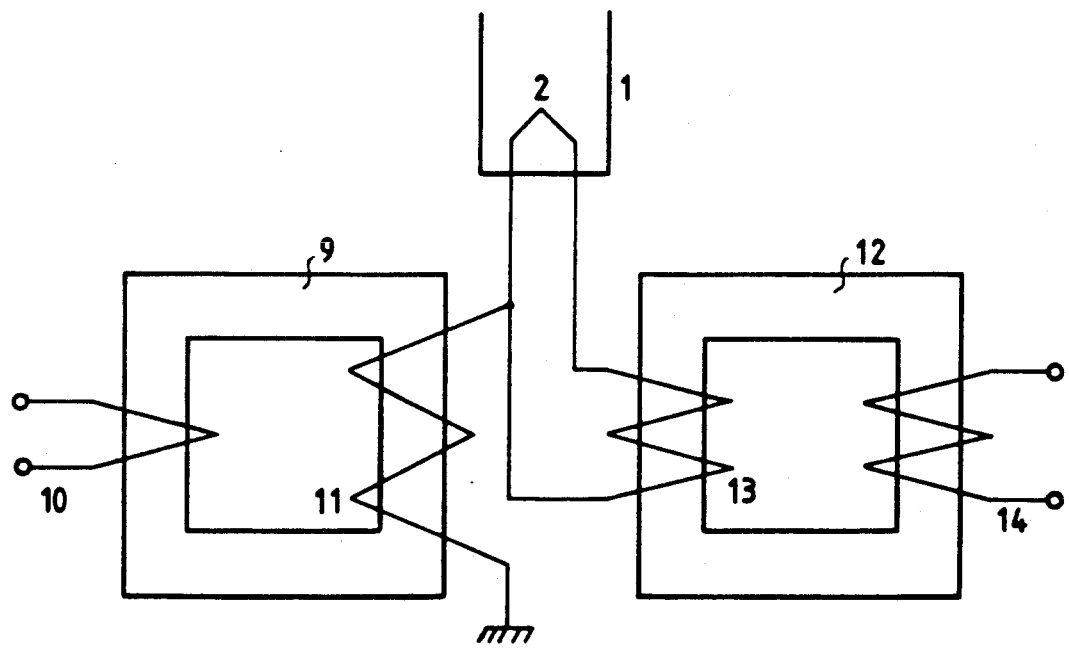
FIG. 2 represents a diagram of an alternative state-of-the-art power supply device.

A state-of-the-art power supply device can be implemented in a radar transmitter, as schematically represented in FIG. 1. Of a radar transmitter tube 1, only a filament 2 is illustrated; it may be assumed that the other parts of the radar transmitter tube are practically at earth potential. Pulse transformer 3 is provided with a primary winding 4, at the input terminals of which a pulse-shaped voltage can be applied. A secondary winding 5 is a bifilar one. A bifilar winding consists of two parallel current conductors instead of a single one. One side of the winding 5 is, via a secondary winding 7 of a filament voltage transformer 6, substantially at earth potential. The other side of the winding 5 is connected to the filament 2 in the way illustrated in FIG. 1. The pulse transformer is wound such that, when a pulse-shaped voltage is applied to the primary side 4, the filament 2 is set to a negative high-voltage potential. The filament voltage transformer 6 is wound such that, when an AC voltage (usually a mains voltage) is applied to the primary side 8, the secondary winding 7 supplies a required filament voltage to the filament 2 via the bifilar secondary winding 5. Filament voltage is needed to heat the filament or a cathode containing the filament to a high temperature to ensure electron emission to a sufficient degree. Since, in the two wires or foils, the current due to the filament voltage, travels in opposite directions, substantially no magnetic field is produced by this current in the pulse transformer 3. On the other hand, however, heat will develop in the bifilar winding as a result of ohmic loss. An alternative state-of-the-art power supply device can be implemented in a radar transmitter, as schematically represented in FIG. 2. Pulse transformer 9 is provided with a primary winding 10, at the input terminals of which a pulse-shaped voltage can be applied. A secondary winding 11 is on one side connected to earth potential and on the other side connected to the filament 2. An AC voltage (usually a mains voltage) is applied to a primary winding 14 of filament transformer 12, a secondary winding 13 furnishing the required filament voltage for the filament. Filament transformer 12 shall be designed such that a stray capacitance between the primary winding 14 and the secondary winding 13 is very small. Furthermore the insulation between the primary winding 14 and the secondary winding 13 shall be such that high-voltage pulses, generated by the pulse transformer 9 can be withstood without breakdown occurring. The requirements entail that the magnetic coupling factor between the primary winding and the secondary winding is rather low, which causes a high leakage self-inductance. As a consequence, the supply voltage to the filament may vary, for instance owing to fluctuations in the temperature of transformer 12, which may affect the operation of the radar transmitter tube 1 and may reduce its useful life.

DESCRIPTION OF THE PREFERRED EMBODIMENTS

Figure 3:
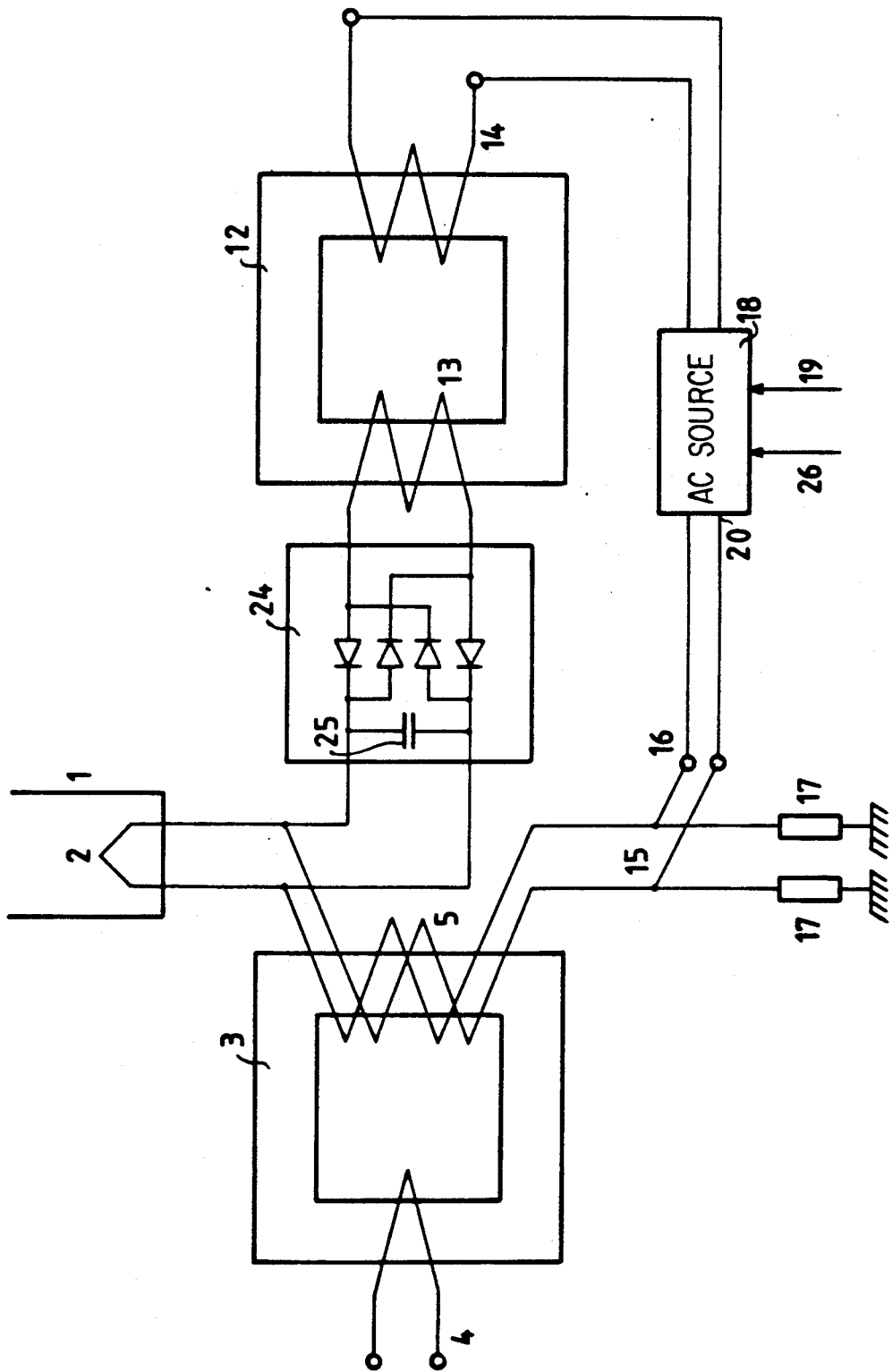
FIG. 3 represents a diagram of a power supply device according to the invention.

A possible embodiment of a power supply device according to the invention is schematically presented in FIG. 3. In this embodiment, a voltage is supplied to filament 2 from the transformer 12, to which, as described above, an AC voltage can be supplied. Pulse transformer 3 is provided with a bifilar secondary winding 5, which in this case is bifilar to enable the filament voltage on the filament 2 to be measured at the end connectors 15 of the bifilar winding 5. To this end, these end connectors are provided with terminals 16.

Decoupling networks 17 substantially form a short-circuit for the high-voltage pulse, generated by the bifilar winding 5. These end connectors 15 are therefore substantially at earth potential. The decoupling networks 17 are, however, connected in series, parallel to the filament and shall therefore be designed such that they only form a negligible load for the filament transformer 12. A suitable decoupling network is provided with a capacitor, to which a high-ohmic resistor is connected in parallel. During operation, the filament voltage can now be measured at the terminals 16. This enables the filament voltage to be continuously monitored.

Filament transformer 12 shall be designed such that parasitic capacitance between primary winding 14 and secondary winding 13 are minimal. This parasitic capacitance is parallel to the load for the pulse transformer 3 formed by the transmitter tube 1 and causes a reduced slope of the pulse, ripple during the pulse and a positive residual voltage after the pulse.

In this field it is well known, that low parasitic capacitance between primary and secondary winding inevitably entails a high leakage self-inductance in the transformer. This renders the voltage on filament 2 dependent of the temperature of the filament transformer and of the frequency of the voltage on the primary winding 14. Moreover, the voltage on the filament 2 naturally depends on the height of the voltage on the primary winding 14, usually the mains voltage.

Figure 4:
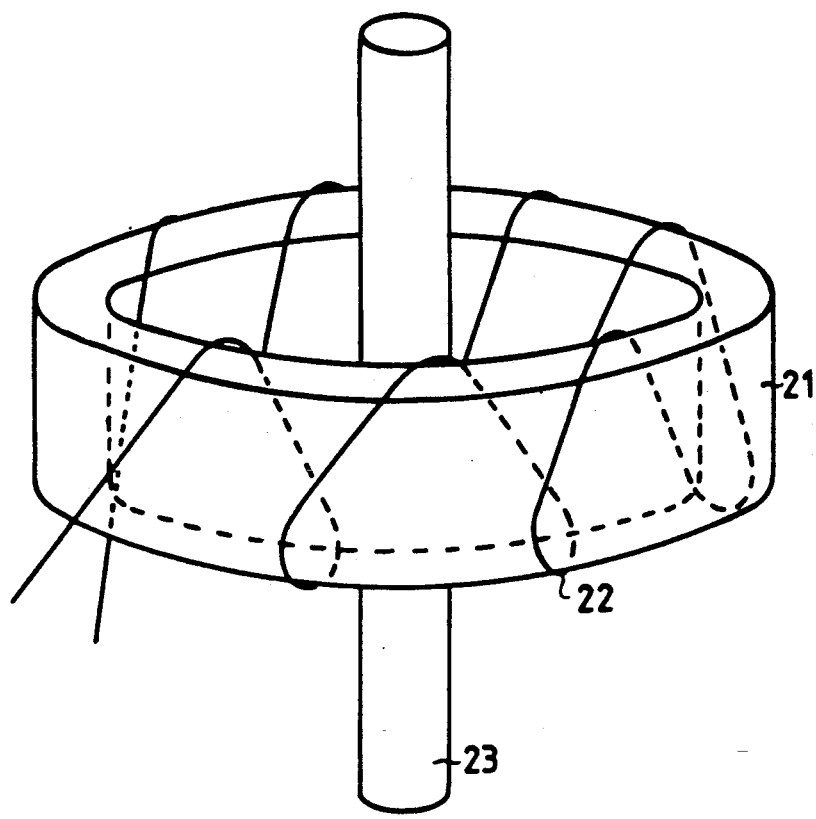
FIG. 4 represents a drawing of the filament voltage transformer.

A highly advantageous embodiment of the invention offers the possibility to connect the primary winding 14 of the filament transformer 12 to a closed-loop regulated AC power source 18, provided with an adjusting device 19 for selecting the required AC voltage. The AC power source 18 is furthermore provided with a sense input 20, which enables the actual voltage of the filament 2 to be measured. This measurement using the sense input 20 is performed via the terminals 16 and the bifilar secondary winding 5 which, in turn, is connected to the filament 2. As a result of the feedback, an accurate and constant filament voltage is obtained and any effects due to the leakage self-inductance are eliminated. If a regulated AC power source 18 with a high frequency is selected, for instance a switched power supply or a resonant convertor, the filament transformer 12 can be designed as illustrated in FIG. 4. Here, the core of the transformer 12 is formed by an annular core 21, which is wound with n primary windings 22 and with a secondary winding, which only consists of one single winding 23. As regards this type of transformer, it is well known in this field that superior insulation-characteristics are coupled to a low parasitic capacitance between the primary winding 22 and the secondary winding 23, the leakage self-inductance of the transformer being optimal. The number of primary windings n can be determined by dividing the nominal output voltage of the AC power source by the required nominal filament voltage of the filament 2.

To effect an optimal insulation between the primary winding 22 and the secondary winding 23, the ratio between the inside diameter of annular core 21 and the outside diameter of the secondary winding 23 is selected to be approximately 2.7. As known from high-voltage technology, the electrical field strength close to the secondary winding will then be minimal.

In the radar transmitter tube the filament, or a cathode heated by the filament, emits electrons under the influence of the high-voltage pulse. It has been found, that the voltage to be applied to the filament slightly affects the speed at which the electrons are emitted. Consequently, the radar transmitter pulse contains, to a limited degree, modulation sidebands with the frequency of the filament voltage. This renders the radar transmitter less suitable for applications where the radar is aimed at exclusively detecting moving targets. Now that the primary winding 14 of the filament transformer 12 is connected to a high-frequency AC power source 18, it is possible to include a rectifier circuit 24 with smoothing capacitors 25 between the secondary winding 13 of the filament transformer 12, as a result of which the modulation sidebands will virtually disappear. High frequency is required because the filament is usually very low-ohmic, which in case of low frequencies would require impossibly large smoothing capacitors. When incorporating a rectifier circuit 24, the AC power source 18 shall be provided with a sense input 20, suitable for handling a DC voltage, since the voltage to be measured by the sense-input is of the DC type.

A further reduction of the modulation sidebands can also be accomplished by equipping the AC power source 18 with a switching facility 26 for switching the AC power source off, shortly before the high-voltage pulse is applied to the radar transmitter tube and switching it on again shortly after the high-voltage pulse. In this case, the selected frequency of the AC power source must be considerably higher than the repetition frequency. On the basis of an assumed repetition frequency of 1 kHz, a pulse duration of the high-voltage pulse of 1 $\mu$sec and a frequency of the AC power source of 100 kHz, the power source is found to be switched off approximately 1% of the time. During this period, the smoothing capacitors 25 of the recifier circuit 24 and the thermal capacity of the filament 2 ensure that the filament maintains a virtually constant temperature.

I claim:

1. Power supply device, particularly suitable for supplying power to a filament of a transmitter tube, provided with a filament transformer, a pulse transformer and terminals for an AC generator, where a secondary side of the filament transformer is coupled with the filament, a primary side of the filament transformer is coupled with the terminals and where a secondary side of the pulse transformer is coupled with the filament, characterised in that the secondary side of the pulse transformer is coupled with the filament via a bifilar winding, the power supply device being furthermore provided with a decoupling network through which the bifilar winding is earthed.

2. Power supply device as claimed in claim 1, provided with an AC generator connected to the terminals, characterised in that the AC generator is closed-loop regulated and provided with a sense input, and that the sense input is connected to the filament via the bifilar winding.

3. Power supply device as claimed in claim 2, characterised in that the filament transformer is provided with an annular core.

4. Power supply device as claimed in claim 3, characterised in that the filament transformer has only one secondary winding.

5. Power supply device as claimed in claim 4, characterised in that the ratio between an inside diameter of the annular core and an outside diameter of the secondary winding is virtually 2.7.

6. Power supply device as claimed in one of the above claims, characterised in that a rectifier circuit is included between the secondary winding of the filament transformer and the filament.

7. Power supply device as claimed in claim 6, characterised in that the rectifier circuit is provided with decoupling capacitors.

8. Power supply device as claimed in one of the claims 2 to 5, characterised in that the AC generator is provided with a switching facility for switching the AC generator off before a high-voltage pulse is applied to the filament and for switching it on again upon termination of the high-voltage pulse.

* * * * *